United States Patent [19]

Itoh

[11] Patent Number: 4,666,260

[45] Date of Patent: May 19, 1987

[54] TELEPHOTO MACRO LENS SYSTEM

[75] Inventor: Takayuki Itoh, Tokyo, Japan

[73] Assignee: Asahi Kogaku Kogyo Kabushiki Kaisha, Tokyo, Japan

[21] Appl. No.: 801,992

[22] Filed: Nov. 25, 1985

[30] Foreign Application Priority Data

Nov. 30, 1984 [JP] Japan ................................ 59-254653

[51] Int. Cl.⁴ .......................... G02B 13/02; G02B 9/64
[52] U.S. Cl. ...................................................... 350/454
[58] Field of Search ................................. 350/454-457

[56] References Cited

U.S. PATENT DOCUMENTS 4,518,229  5/1985  Yasukuni ............................. 350/454
4,558,928  12/1985  Imaizumi ............................. 350/454

*Primary Examiner*—John K. Corbin
*Assistant Examiner*—Scott J. Sugarman
*Attorney, Agent, or Firm*—Sughrue, Mion, Zinn, Macpeak & Seas

[57] ABSTRACT

A telephoto macro lens system includes, in order from the object side, a first lens group having a positive focal length and a second lens group having a negative focal length. The first lens group is composed of a first subgroup (1a) including a positive lens group and a negative meniscus lens and a second subgroup (1b) including a negative lens having a divergent surface on the object side. The second lens group is composed of a third subgroup (2a) having a large negative refractive power and a positive unitary lens (2b) spaced from the third subgroup. The lens system is so constructed as to satisfy the following conditions:

(1) $1.0 < F/F_{1a} < 1.8$;
(2) $1.5 < F/F_1 < 2.3$;
(3) $-3.7 < F/F_{2a} < -2.5$;
(4) $-2.5 < F/f_{1b} < -0.8$, wherein $f_{1b} = r_{1b}/(N_{1b} - 1)$; and
(5) $0.15 < (l_{2a} - 2b)/F < 0.35$ wherein:

F is the focal length of the overall lens system;
$F_{1a}$ is the focal length of the first subgroup;
$F_1$ is the focal length of the first lens group;
$F_{2a}$ is the focal length of the third subgroup;
$f_{1b}$ is the focal length of the surface on the object side of the negative lens in the second subgroup;
$r_{1b}$ is the radius of curvature of the surface on the object side of the negative lens in the second subgroup;
$N_{1b}$ is the refractive index at d-line of the negative lens in the second subgroup; and
$l_{2a} - 2b$ is the distance between the third subgroup and the unitary lens of the second lens group.

8 Claims, 16 Drawing Figures

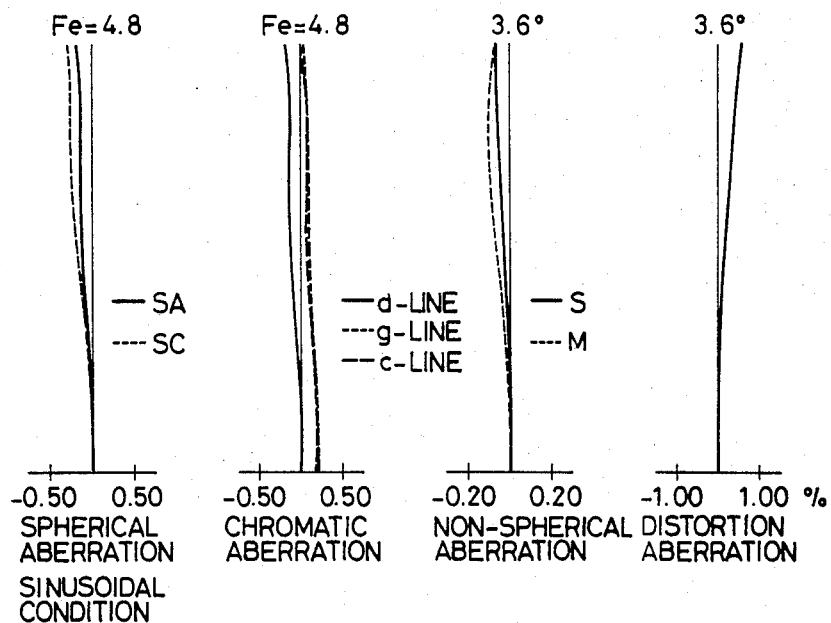
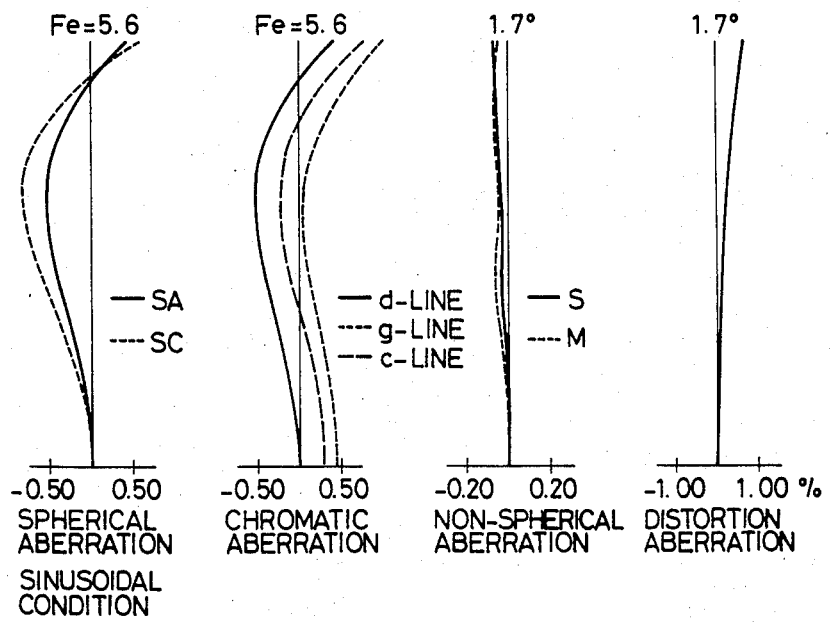

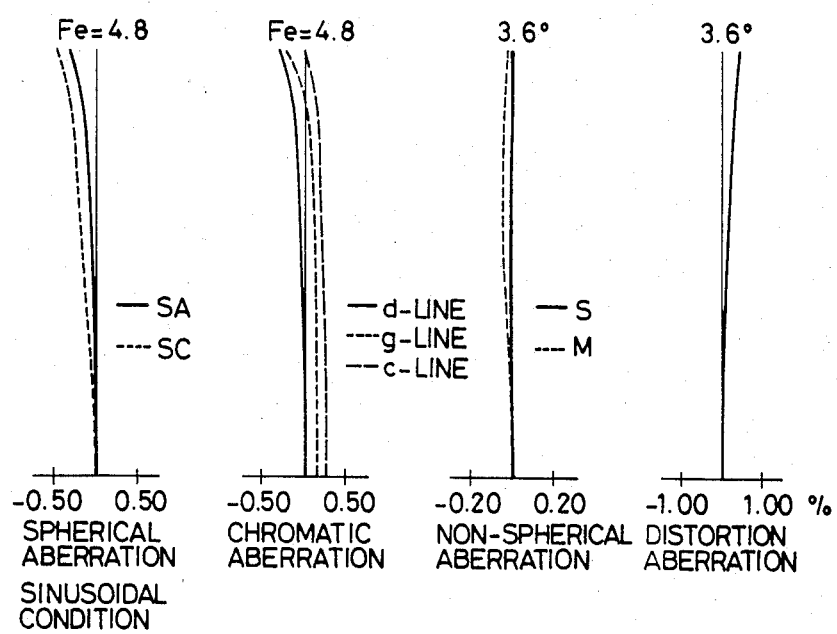
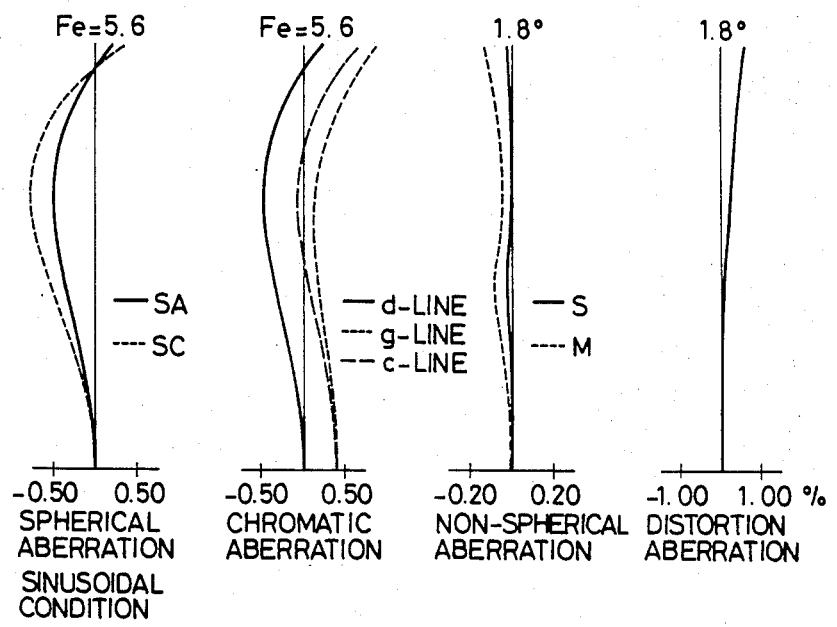

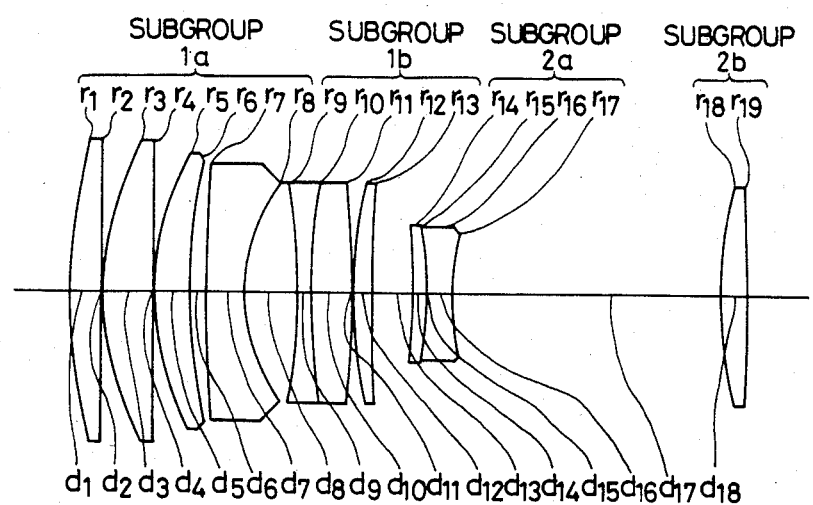
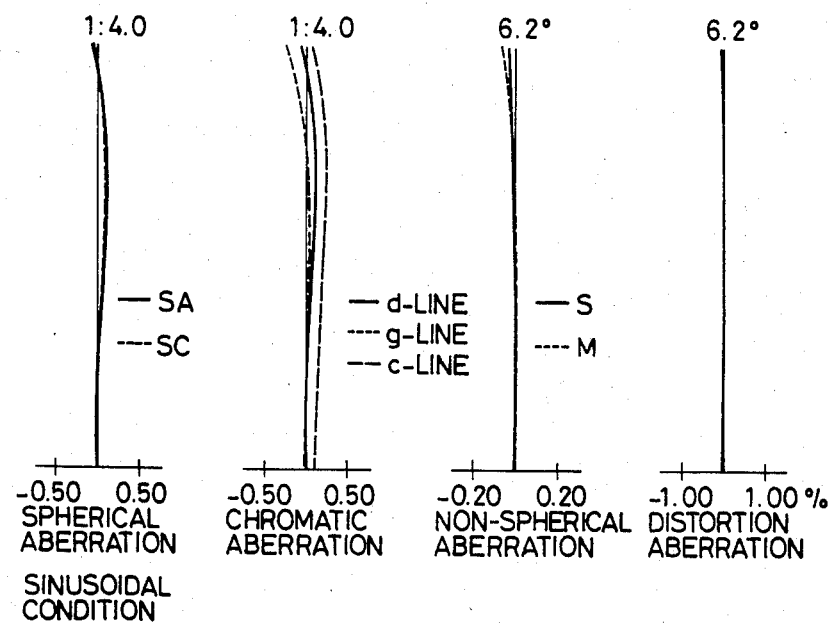

TELEPHOTO MACRO LENS SYSTEM

BACKGROUND OF THE INVENTION

The present invention relate to a telephoto macro lens system that has a telephoto focal length useful with a 35 mm still camera and which exhibits high performance in taking pictures of all objects ranging from an infinite object distance to unity magnification.

The operating range of a conventional telephoto lens is from an infinity to approximately 1/10 magnification, and in order to take an object at a unity magnification, an accessory such as a closeup ring or a helicoid must be used. However, attaining a unity magnification with a telephoto lens using an adequately long accessory is outside the usual range of the operating conditions of the telephoto lens and only insufficient results are obtained. A normal lens or a semitelephoto lens is capable of taking pictures of all objects ranging from an infinite object distance to unit magnification, but given the same magnification, the distance between the lens and the object is so small that a tiny creature will be scared by the camera to move out of focus. A macro lens which may be considered as a telephoto lens is also available but the maximum magnification attained is up to ½ or even the macro lens capable of unity magnification exhibits poor performance because of great spherical, coma and chromatic aberrations resulting from changes in the object distance.

SUMMARY OF THE INVENTION

A macro lens that has the abilities of a telephoto lens is effective for the purpose of taking pictures of difficult-to-access objects such as tiny creatures and body organs; in addtion, the ability of the macro lens to take pictures at unity magnification is highly advantageous in maneuvevability as compared with the use of a closeup ring or helicoid in order to attain higher magnifications. This explains the strong need of the user for the development of a macro lens, especially one having high performance, that can be used as a telephoto lens.

The principal object, therefore, of the present invention is to meet this need and solve all the problems associated with the prior art. More specifically, the invention aims at providing a telephoto macro lens system that has a sufficient telephoto focal length to permit a greater distance between the lens and the object and which is capable of high-performance picture taking for all objects ranging from an infinite object distance to a unity magnification.

The above stated object of the present invention can be attained by a telephoto macro lens system that is composed of an arrangement including, in order from the object side, a first lens group having a positive focal length and a second lens group having a negative focal length, said first lens group being composed of a first subgroup consisting of a positive lens group and a negative meniscus lens and a second subgroup including a negative lens having a divergent surface on the object side, said second lens group being composed of a third subgroup having a large negative refractive power and a positive unitary lens spaced from said third subgroup, and said lens system being so constructed as to satisfy the following conditions:

(1) $1.0 < F/F_{1a} < 1.8$;
(2) $1.5 < F/F_1 < 2.3$;
(3) $-3.7 < F/F_{2a} < -2.5$;
(4) $-2.5 < F/f_{1b} < -0.8$, wherein $f_{1b} = r_{1b}/(N_{1b}-1)$; and
(5) $0.15 < l_{2a-2b}/F < 0.35$, wherein:
F is the focal length of the overall lens system;
$F_{1a}$ is the focal length of the first subgroup;
$F_1$ is the focal length of the first lens group;
$F_{2a}$ is the focal length of the third subgroup;
$f_{1b}$ is the focal length of the surface on the object side of the negative lens in the second subgroup;
$r_{1b}$ is the radius of curvature of the surface on the object side of the negative lens in the second subgroup;
$N_{1b}$ is the refractive index at d-line of the negative lens in the second subgroup; and
$l_{2a-2b}$ is the distance between the third subgroup and the positive lens of the second lens group.

The arrangement of lens elements in the lens system of the present invention is shown more specifically below. The first subgroup grup consists of a positive lens group composed of three positive lens elements and a negative meniscus lens whose convex surface is directed to the object; the second subgroup group consists of a cemented lens composed of a negative lens whose concave surface is directed to the object and a positive lens, and another positive lens; the third subgroup consists of a positive lens and a negative bioconcave lens; and the unitary lens of the second lens group consists of a single positive element.

For the purpose of attaining a higher performance, the positive lens elements in the first subgroup desirably have an average Abbe number $\bar{v}_{lap}$ greater than 70.

In order to satisfy the requirements for a smaller size, an improved maneuverability, higher performance and higher magnifications, the telephoto macro lens system having the arrangement described above may be operated to attain the right focus by one of the following methods:

(1) move principally the first lens group toward the object;
(2) move the entire first lens group toward the object while changing the distance between the first and second subgroups;
(3) move principally the first lens group (including one capable of changes in the distance between the first and second subgroups toward the object while also moving the second lens group; and
(4) move principally the first lens group toward the object while also moving the unitary lens of the second lens group.

BRIEF DESCRIPTION OF THE DRAWINGS

FIGS. 1, 3, 5 and 7 show the lens arrangements for an infinite object distance that were used in Examples 1, 2, 3 and 4, respectively;

Figure 1:
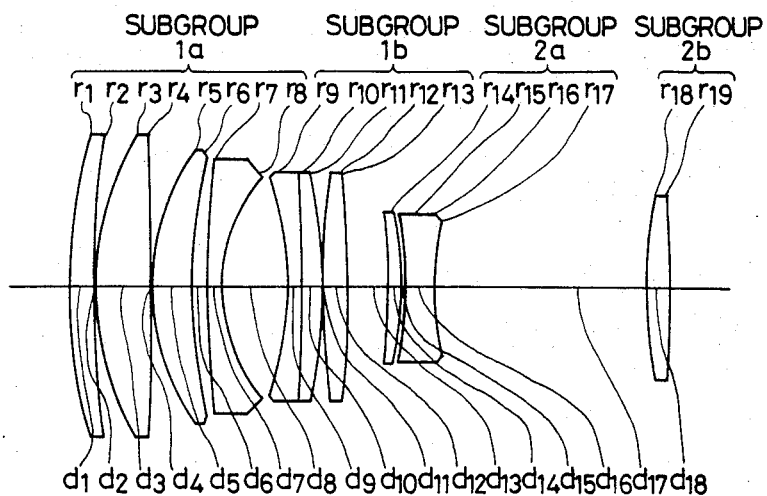
Figure 2A:
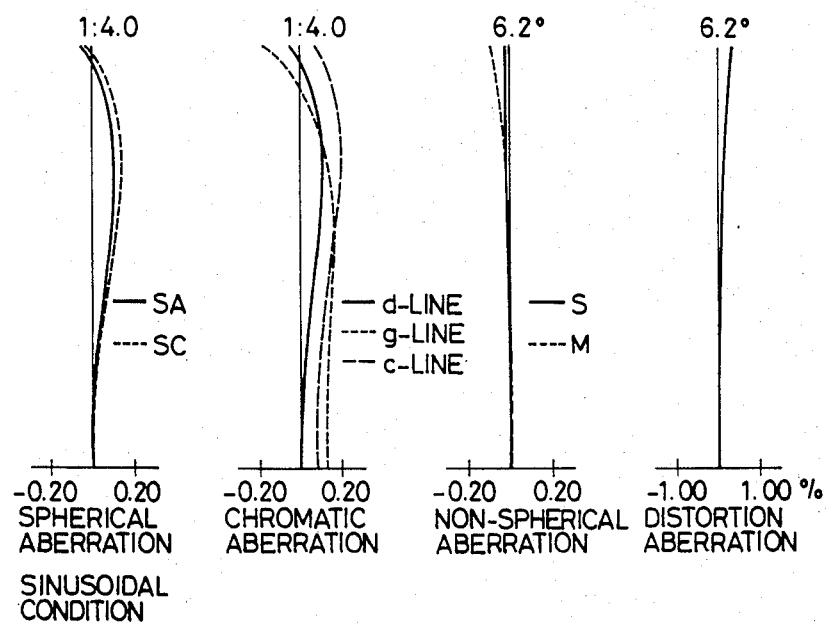
FIGS. 2, 4, 6 and 8 show four difference aberrations that occurred in each of Examples 1, 2, 3 and 4, wherein (a) assumes an infinite object distance, (b) a ½ magnification, and (c) a unity magnification.
Figure 3:
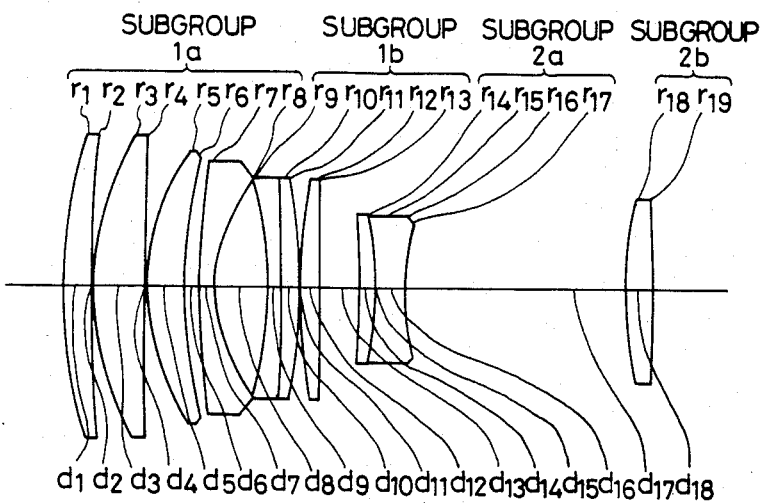
Figure 4A:
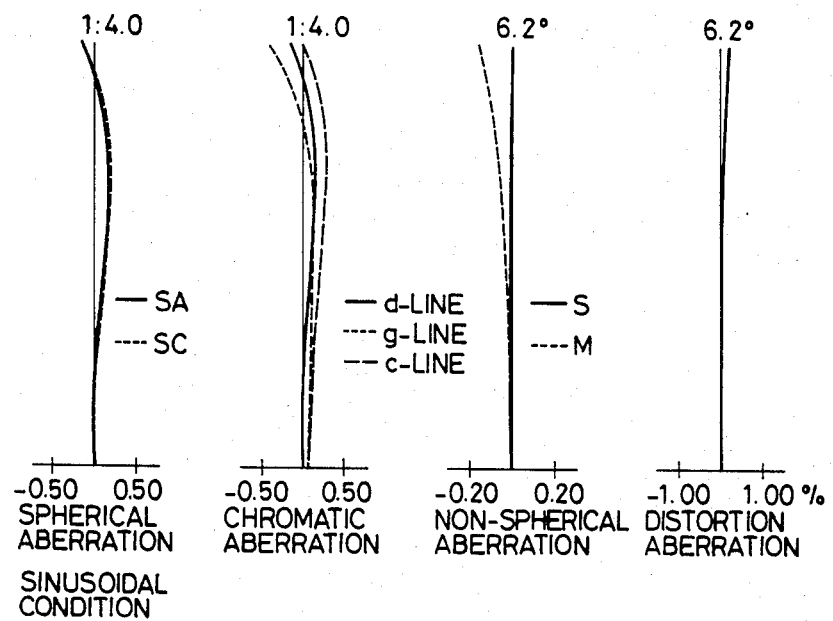
Figure 5:
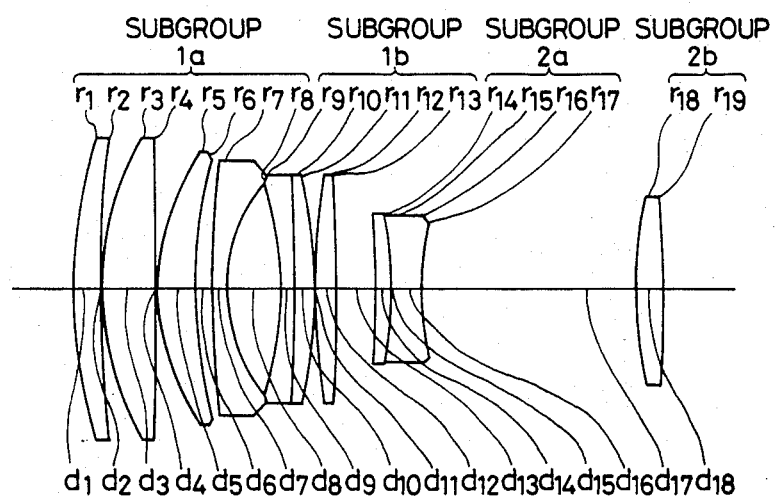
Figure 6A:
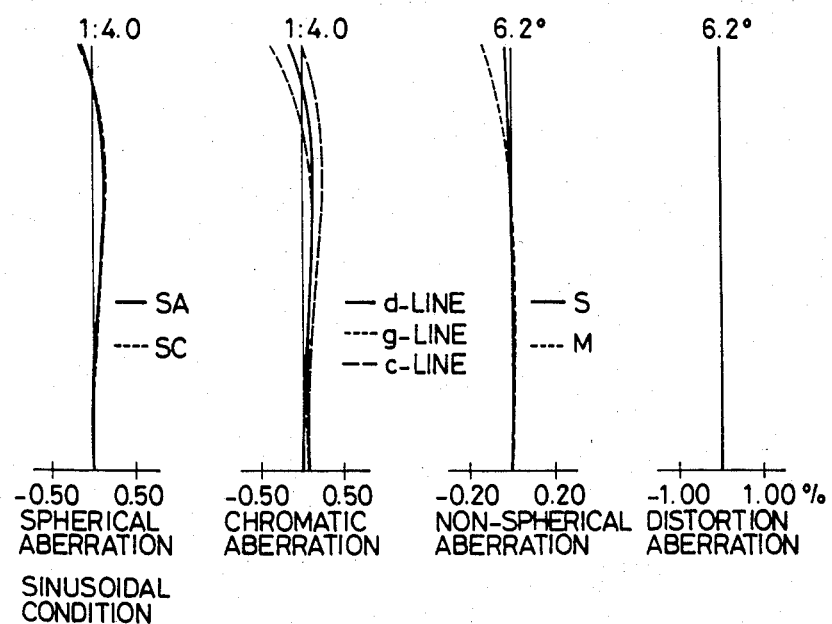
Figure 6B:
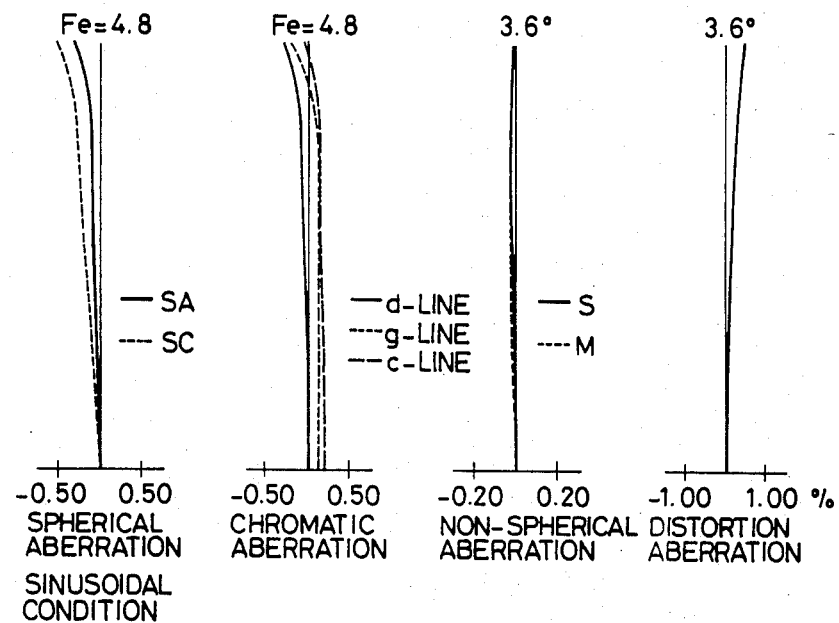
Figure 6C:
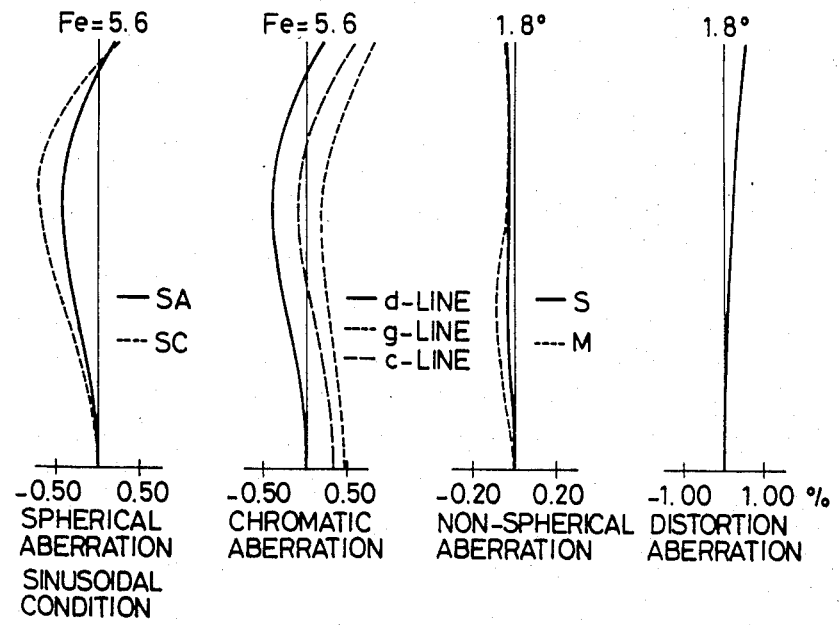
Figure 8B:
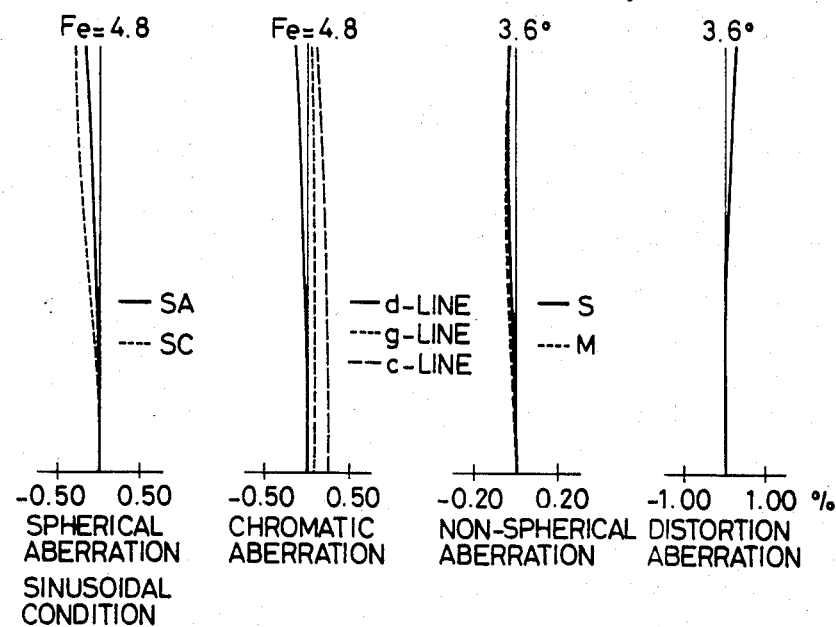
Figure 8C:
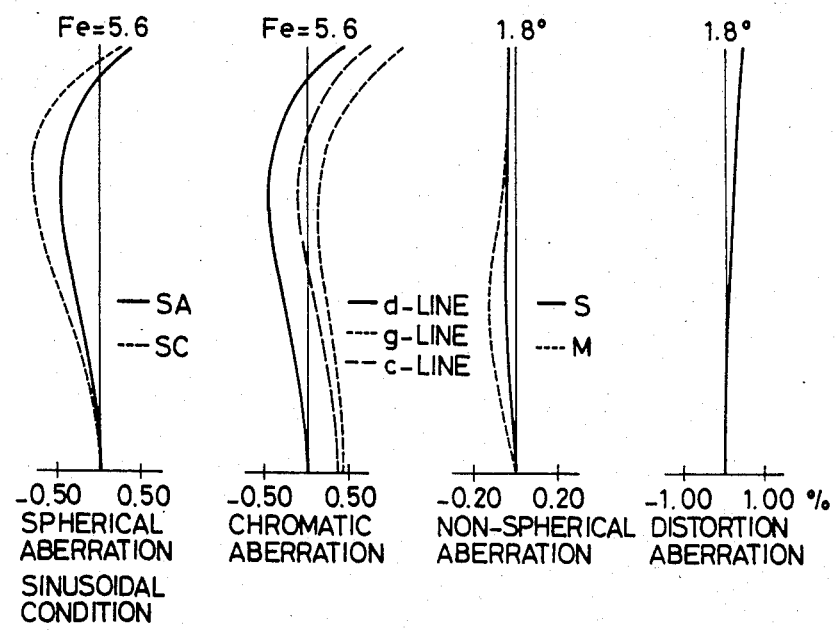

In the Figures, ri denotes the radius of curvature of each lens surface, di represents the lens thickness or the aerial distance between adjacent lens surfaces, Fe is the effective F number of for a finite object distance, provided that the half view angle is that of the major light beam.

DETAILED DESCRIPTION OF THE PREFERRED EMBODIMENTS

A smaller lens system will result if the upper limit of condition (1) is exceeded, but on the other hand, the excessive refractive power of the first subgroup introduces too great chromatic and spherical aberrations to be cancelled by the divergent surfaces of the second or third subgroups. Advantages in terms of compensation of aberrations will result if the lower limit of condition (1) is not reached, but then the power of the divergent surfaces of the second subgroup must be decreased and the production of a larger lens system is inevitable.

Condition (2) relates to the power of the first lens group and the principal factor that is determined by this condition is the amount of movement of the first lens group associated with focusing operations. As will be shown later in this specification, the amount of movement of the first lens group necessary for attaining the right focus is the reciprocal of the square of $(F/F_1)$ as compared with the amount of movement of the overall lens system. A compact lens system will result if the upper limit of condition (2) is exceeded, but on the other hand, the excessive power of the first lens group introduces too great chromatic and spherical aberrations to be cancelled by the negative refractive power of the third subgroup. Advantages in terms of compensation of aberrations will result if the lower limit of condition (2) is not reached but then the required amount of movement of the first lens group is greatly increased and the object of making a compact lens system is not attained.

Condition (3) must be met in order to provide a balanced correction or compensation of aberrations occurring in the first lens group. If the upper limit of condition (3) is exceeded, the aberrations generated in the first lens group are compensated only insufficiently on the short range side, and this requires the reduction in the refractive power of the first lens group, leading to an increased in the necessary amount of movement of the first lens group. If the lower limit of condition (3) is not reached, the excessive negative power of subgroup (2) of the second lens group causes an undesirable over compensation.

Condition (4) relates to the refractive power of the divergent surfaces of the second subgroup. If the upper limit of condition (4) is exceeded, spherical aberrations generated in the first subgroup are undercompensated, and if the lower limit of condition (4) is not reached, overcompensation occurs.

Condition (5) relates to the power configuration within the second lens group. Advantages in terms of compensation of aberrations will result if the upper limit of condition (5) is exceeded, but on the other hand, the diameter of the final lens is increased so that a complicated lens barrel and a larger lens system will result. If the lower limit of conditionno (5) is not reached, a balance cannot be struck between the curvature of field and the distortion.

As shown above, the present invention ensures the making of a high performance telephoto macro lens system by satisfying all of the conditions (1) to (5). A lens system of an even higher performance can be obtained by achieving super-achromatism through the use of superlow dispersion glass ($70 < \overline{\nu_{lap}}$) in each of the positive lens elements on the object side of the first subgroup.

Focusing by means of principally moving the first lens group toward the object is particularly effective for the purposes of making a compact and highly maneuverable lens system because the amount of movement necessary for attaining the same magnification is the reciprocal of the square of the ratio of F (the focal length of the overall lens system) to $F_1$ (the focal length of the first lens group), or takes the value of approximately one quarter in the Examples to be shown later, as compared with the amount of movement required in the case of focusing by means of moving the entire lens system.

In order to strike a balance between aberrations for all magnifications ranging from infinity to unity, the distance between the first and second subgroups may be changed, or alternatively, the second lens group or the unitary lens of the second lens group may also be moved, and either method provides a greater degree of freedom and will contribute to the making of a higher-performance lens system. In addition, the amount of movement of the first lens group can be reduced by designing the second lens group or the unitary lens of the second lens group to be movable toward the image, rather than the object toward which the first lens group is moved.

EXAMPLES

Examples 1 to 4 are hereunder provided to further illustrate the present invention. The symbols used in each of the Example have the followig meanings: F, the focal length for an infinite object distance; $\omega$, the half-view angle for an infinite object distance; WD, the distance between the object and the first lens surface; $f_B$, back focal distance; r, the radius of curvature of each lens surface; d, lens thickness or the aerial distance between adjacent lens surfaces; N, the refractive index of each lens at d-line; and $\nu$, the Abbe number of each lens.

Example 1

| F No. 1:4 | | | $\omega = 6.2°$ | |
|---|---|---|---|---|
| WD = ∞ − 302.2 | | F = 200 | $f_B = 76.9$ | |
| No. | r | d | N | $\nu$ |
| 1 | 100.700 | 4.50 | 1.48749 | 70.1 |
| 2 | 214.834 | 0.50 | | |
| 3 | 56.079 | 9.96 | 1.49700 | 81.6 |
| 4 | −2002.939 | 0.50 | | |
| 5 | 42.778 | 7.32 | 1.49700 | 81.6 |
| 6 | 100.598 | 2.82 | | |
| 7 | 181.169 | 2.80 | 1.61340 | 43.8 |
| 8 | 31.143 | 12.41 | | |
| 9 | −59.122 | 2.50 | 1.61293 | 37.0 |
| 10 | −389.821 | 3.68 | 1.69680 | 55.5 |
| 11 | −98.827 | 0.20 | | |
| 12 | 147.652 | 4.59 | 1.73400 | 51.5 |
| 13 | −226.517 | 7.53 − 35.05 − 62.58 | | |
| 14 | −167.918 | 2.50 | 1.80518 | 25.4 |
| 15 | −77.836 | 0.70 | | |
| 16 | −95.674 | 5.50 | 1.71300 | 53.8 |
| 17 | 54.994 | 39.83 | | |
| 18 | 95.940 | 4.30 | 1.51633 | 64.1 |
| 19 | −321.938 | | | |
| $F/F_{1a} = 1.336$ | | $F/F_1 = 1.906$ | | |
| $F/F_{2a} = -2.986$ | | $F/f_{1b} = -2.073$ | | |
| $\frac{l_{2a-2b}}{F} = 0.199$ | | $\overline{\nu_{lap}} = 77.8$ | | |

In Example 1, focusing is realized by moving the first lens group toward the object.

Example 2

| No. | r | d | N | ν |
|---|---|---|---|---|
| | F No. 1:4 | | ω = 6.2° | |
| | WD = ∞ − 301.2 | F = 200 | $f_B$ = 75.9 | |
| 1 | 94.377 | 5.00 | 1.48749 | 70.1 |
| 2 | 336.126 | 0.50 | | |
| 3 | 54.902 | 9.41 | 1.49700 | 81.6 |
| 4 | 1688.359 | 0.50 | | |
| 5 | 42.870 | 6.82 | 1.49700 | 81.6 |
| 6 | 88.834 | 2.87 | | |
| 7 | 151.135 | 2.80 | 1.58921 | 41.1 |
| 8 | 30.207 | 10.12 − 11.31 − 12.51 | | |
| 9 | −67.785 | 2.50 | 1.63636 | 35.4 |
| 10 | −507.714 | 3.44 | 1.77250 | 49.7 |
| 11 | −106.866 | 0.20 | | |
| 12 | 126.104 | 3.67 | 1.77250 | 49.7 |
| 13 | −1147.187 | 7.38 − 31.16 − 55.15 | | |
| 14 | −225.398 | 2.83 | 1.80518 | 25.4 |
| 15 | −69.096 | 0.10 | | |
| 16 | −81.029 | 5.50 | 1.77250 | 49.7 |
| 17 | 51.450 | 40.65 | | |
| 18 | 86.766 | 5.00 | 1.51633 | 64.1 |
| 19 | −378.356 | | | |

$F/F_{1a} = 1.499$    $F/F_1 = 2.027$
$F/F_{2a} = -3.317$    $F/f_{1b} = -1.878$ $$\frac{l_{2a-2b}}{F} = 0.203 \qquad \overline{\nu lap} = 77.8$$

In Example 2, focusing is realized by moving the entire first lens group while changing the distance between the first and second subgroups.

Example 3

| No. | r | d | N | ν |
|---|---|---|---|---|
| | F No. 1:4 | | ω = 6.2° | |
| | WD = ∞ − 301.8 | F = 200 | $f_B$ = 79.4−75.5 | |
| 1 | 94.721 | 5.00 | 1.48749 | 70.1 |
| 2 | 272.535 | 0.50 | | |
| 3 | 55.467 | 9.73 | 1.49700 | 81.6 |
| 4 | −2363.353 | 0.50 | | |
| 5 | 42.491 | 7.07 | 1.49700 | 81.6 |
| 6 | 94.390 | 2.96 | | |
| 7 | 180.755 | 2.80 | 1.61340 | 43.8 |
| 8 | 30.633 | 10.17 − 11.58 − 12.50 | | |
| 9 | −60.559 | 2.50 | 1.63636 | 35.4 |
| 10 | −401.868 | 3.71 | 1.69680 | 55.5 |
| 11 | −89.719 | 0.20 | | |
| 12 | 141.850 | 3.80 | 1.77250 | 49.7 |
| 13 | −428.544 | 7.41 − 33.58 − 59.15 | | |
| 14 | −207.666 | 2.79 | 1.80518 | 25.4 |
| 15 | −69.894 | 0.10 | | |
| 16 | −83.678 | 5.50 | 1.77250 | 49.7 |
| 17 | 52.083 | 39.67 | | |
| 18 | 87.211 | 5.00 | 1.51633 | 64.1 |
| 19 | −285.410 | | | |

$F/F_{1a} = 1.451$    $F/F_1 = 1.977$
$F/F_{2a} = -3.310$    $F/f_{1b} = -2.102$ $$\frac{l_{2a-2b}}{F} = 0.198 \qquad \overline{\nu lap} = 77.8$$

In Example 3, focusing is performed by moving the second lens group in addition to the first lens group that is moved en masse toward the object while changing the distance between the first and second subgroups.

Example 4

| No. | r | d | N | ν |
|---|---|---|---|---|
| | F No. 1:4 | | ω = 6.2° | |
| | WD = ∞ − 301.8 | F = 200 | $f_B$ = 61.0 | |
| 1 | 100.422 | 5.70 | 1.48749 | 70.1 |
| 2 | 1429.490 | 0.50 | | |
| 3 | 56.341 | 9.02 | 1.49700 | 81.6 |
| 4 | 854.349 | 0.50 | | |
| 5 | 51.589 | 6.56 | 1.49700 | 81.6 |
| 6 | 109.922 | 3.07 | | |
| 7 | 283.128 | 7.00 | 1.61340 | 43.8 |
| 8 | 32.879 | 10.00 | | |
| 9 | −117.511 | 2.50 | 1.63636 | 35.4 |
| 10 | 136.356 | 7.63 | 1.69680 | 55.5 |
| 11 | −202.731 | 0.20 | | |
| 12 | 99.389 | 3.57 | 1.77250 | 49.7 |
| 13 | 756.104 | 7.31 − 33.61 − 60.91 | | |
| 14 | −230.002 | 2.66 | 1.80518 | 25.4 |
| 15 | −70.366 | 0.10 | | |
| 16 | −81.760 | 4.59 | 1.77250 | 49.7 |
| 17 | 51.723 | 49.94 − 49.97 − 46.34 | | |
| 18 | 78.773 | 5.00 | 1.51633 | 64.1 |
| 19 | −330.880 | | | |

$F/F_{1a} = 1.375$    $F/F_1 = 1.949$
$F/F_{2a} = -3.309$    $F/f_{1b} = -1.083$ $$\frac{l_{2a-2b}}{F} = 0.249 \qquad \overline{\nu lap} = 77.8$$

In Example 4, focusing is carried out by moving the unitary lens of the second lens group while moving the first lens group toward the object.

What is claimed is:

1. A telephoto macro lens system, comprising, in order from the object side: a first lens group having a positive focal length and a second lens group having a negative focal length, said first lens group being composed of a first subgroup (1a) consisting of a positive lens group and a negative meniscus lens and a second subgroup (1b) including a negative lens having a divergent surface on the object side, said second lens group being composed of a third subgroup (2a) having a large negative refractive power and a positive unitary lens (2b) spaced from said third subgroup, and said lens system satisfying the following conditions:

(1) $1.0 < F/F_{1a} < 1.8$;
(2) $1.5 < F/F_1 < 2.3$;
(3) $-3.7 < F/F_{2a} < -2.5$;
(4) $-2.5 < F/f_{1b} < 0.8$, wherein $f_{1b} = r_{1b}/(N_{1b}-1)$; and
(5) $0.15 < (l_{2a-2b})/F < 0.35$, wherein:
f is the focal length of the overall lens system.
$F_{1a}$ is the focal length of the first subgroup;
$F_1$ is the focal length of the first lens group;
$F_{2a}$ is the focal length of the third subgroup;
$f_{1b}$ is the focal length of the surface on the object side of the negative lens in the second subgroup;
$r_{1b}$ is the radius of curvature of the surface on the object side of the negative lens in the second subgroup;
$N_{1b}$ is the refractive index at d-line of the negative lens in the second subgroup; and
$l_{2a-2b}$ is the distance between the third subgroup and the unitary lens of the second lens group.

2. A telephoto macro lens system according to claim 1 wherein the first subgroup consists of a positive lens group composed of three positive lens elements and a negative meniscus lens whose convex surface is directed to the object; and the second subgroup consists of a cemented lens composed of a negative lens whose concave surface is directed to the object and a positive lens, and another positive lens.

3. A telephoto macro lens system according to claim 1 wherein the third subgroup consists of a positive lens and a negative bioconcave lens; and subgroup the unitary lens consists of a single positive element.

4. A telephoto macro lens system according to claim 1 wherein the positive lens elements in the first subgroup have an average Abbe number $\overline{\nu\text{lap}}$ greater than 70.

5. A telephone macro lens system according to claim 1 wherein focusing is realized by moving principally the first lens group toward the object and wherein:

| F No. 1:4 WD = ∞ − 302.2 | | F = 200 | $\omega = 6.2°$ $f_B = 76.9$ | |
|---|---|---|---|---|
| No. | r | d | N | $\nu$ |
| 1 | 100.700 | 4.50 | 1.48749 | 70.1 |
| 2 | 214.834 | 0.50 | | |
| 3 | 56.079 | 9.96 | 1.49700 | 81.6 |
| 4 | −2002.939 | 0.50 | | |
| 5 | 42.778 | 7.32 | 1.49700 | 81.6 |
| 6 | 100.598 | 2.82 | | |
| 7 | 181.169 | 2.80 | 1.61340 | 43.8 |
| 8 | 31.143 | 12.41 | | |
| 9 | −59.122 | 2.50 | 1.61293 | 37.0 |
| 10 | −389.821 | 3.68 | 1.69680 | 55.5 |
| 11 | −98.827 | 0.20 | | |
| 12 | 147.652 | 4.59 | 1.73400 | 51.5 |
| 13 | −226.517 | 7.53 − 35.05 − 62.58 | | |
| 14 | −167.918 | 2.50 | 1.80518 | 25.4 |
| 15 | −77.836 | 0.70 | | |
| 16 | −95.674 | 5.50 | 1.71300 | 53.8 |
| 17 | 54.994 | 39.83 | | |
| 18 | 95.940 | 4.30 | 1.51633 | 64.1 |
| 19 | −321.938 | | | |

$F/F_{1a} = 1.336$  $F/F_1 = 1.906$
$F/F_{2a} = -2.986$  $F/f_{1b} = -2.073$ $$\frac{l_{2a-2b}}{F} = 0.199 \quad \overline{\nu\text{lap}} = 77.8$$

6. A telephoto macro lens system according to claim 1 wherein focusing is realized by moving the entire first lens group toward the object while changing the distance between the first and second subgroups wherein:

| F No. 1:4 WD = ∞ − 301.2 | | F = 200 | $\omega = 6.2°$ $f_B = 75.9$ | |
|---|---|---|---|---|
| No. | r | d | N | $\nu$ |
| 1 | 94.377 | 5.00 | 1.48749 | 70.1 |
| 2 | 336.126 | 0.50 | | |
| 3 | 54.902 | 9.41 | 1.49700 | 81.6 |
| 4 | 1688.359 | 0.50 | | |
| 5 | 42.870 | 6.82 | 1.49700 | 81.6 |
| 6 | 88.834 | 2.87 | | |
| 7 | 151.135 | 2.80 | 1.58921 | 41.1 |
| 8 | 30.207 | 10.12 − 11.31 − 12.51 | | |
| 9 | −67.785 | 2.50 | 1.63636 | 35.4 |
| 10 | −507.714 | 3.44 | 1.77250 | 49.7 |
| 11 | −106.866 | 0.20 | | |
| 12 | 126.104 | 3.67 | 1.77250 | 49.7 |
| 13 | −1147.187 | 7.38 − 31.16 − 55.15 | | |
| 14 | −225.398 | 2.83 | 1.80518 | 25.4 |
| 15 | −69.096 | 0.10 | | |
| 16 | −81.029 | 5.50 | 1.77250 | 49.7 |
| 17 | 51.450 | 40.65 | | |
| 18 | 86.766 | 5.00 | 1.51633 | 64.1 |
| 19 | −378.356 | | | |

$F/F_{1a} = 1.499$  $F/F_1 = 2.027$
$F/F_{2a} = -3.317$  $F/f_{1b} = -1.878$ $$\frac{l_{2a-2b}}{F} = 0.203 \quad \overline{\nu\text{lap}} = 77.8$$

7. A telephoto macro lens system according to claim 1 wherein focusing is realized by moving the second lens group in addition to the first lens group which is moved toward the object, and wherein:

| F No. 1:4 WD = ∞ − 301.8 | | F = 200 | $\omega = 6.2°$ $f_B = 79.4-75.5$ | |
|---|---|---|---|---|
| No. | r | d | N | $\nu$ |
| 1 | 94.721 | 5.00 | 1.48749 | 70.1 |
| 2 | 272.535 | 0.50 | | |
| 3 | 55.467 | 9.73 | 1.49700 | 81.6 |
| 4 | −2363.353 | 0.50 | | |
| 5 | 42.491 | 7.07 | 1.49700 | 81.6 |
| 6 | 94.390 | 2.96 | | |
| 7 | 180.755 | 2.80 | 1.61340 | 43.8 |
| 8 | 30.633 | 10.17 − 11.58 − 12.50 | | |
| 9 | −60.559 | 2.50 | 1.63636 | 35.4 |
| 10 | −401.868 | 3.71 | 1.69680 | 55.5 |
| 11 | −89.719 | 0.20 | | |
| 12 | 141.850 | 3.80 | 1.77250 | 49.7 |
| 13 | −428.544 | 7.41 − 33.58 − 59.15 | | |
| 14 | −207.666 | 2.79 | 1.80518 | 25.4 |
| 15 | −69.894 | 0.10 | | |
| 16 | −83.678 | 5.50 | 1.77250 | 49.7 |
| 17 | 52.083 | 39.67 | | |
| 18 | 87.211 | 5.00 | 1.51633 | 64.1 |
| 19 | −285.410 | | | |

$F/F_{1a} = 1.451$  $F/F_1 = 1.977$
$F/F_{2a} = -3.310$  $F/f_{1b} = -2.102$ $$\frac{l_{2a-2b}}{F} = 0.198 \quad \overline{\nu\text{lap}} = 77.8$$

8. A telephoto macro lens system according to claim 1 wherein focusing is realized by moving the unitary lens of the second lens group in addition to the first lens group which is moved toward the object, wherein:

| F No. 1:4 WD = ∞ − 301.8 | | F = 200 | $\omega = 6.2°$ $f_B = 61.0$ | |
|---|---|---|---|---|
| No. | r | d | N | $\nu$ |
| 1 | 100.422 | 5.70 | 1.48749 | 70.1 |
| 2 | 1429.490 | 0.50 | | |
| 3 | 56.341 | 9.02 | 1.49700 | 81.6 |
| 4 | 854.349 | 0.50 | | |
| 5 | 51.589 | 6.56 | 1.49700 | 81.6 |
| 6 | 109.922 | 3.07 | | |
| 7 | 283.128 | 7.00 | 1.61340 | 43.8 |
| 8 | 32.879 | 10.00 | | |
| 9 | −117.511 | 2.50 | 1.63636 | 35.4 |
| 10 | 136.356 | 7.63 | 1.69680 | 55.5 |
| 11 | −202.731 | 0.20 | | |
| 12 | 99.389 | 3.57 | 1.77250 | 49.7 |
| 13 | 756.104 | 7.31 − 33.61 − 60.91 | | |
| 14 | −230.002 | 2.66 | 1.80518 | 25.4 |
| 15 | −70.366 | 0.10 | | |
| 16 | −81.760 | 4.59 | 1.77250 | 49.7 |
| 17 | 51.723 | 49.94 − 49.97 − 46.34 | | |
| 18 | 78.773 | 5.00 | 1.51633 | 64.1 |
| 19 | −330.880 | | | |

$F/F_{1a} = 1.375$  $F/F_1 = 1.949$
$F/F_{2a} = -3.309$  $F/f_{1b} = -1.083$ $$\frac{l_{2a-2b}}{F} = 0.249 \quad \overline{\nu\text{lap}} = 77.8$$

* * * * *